June 22, 1943.　　　H. F. FRUTH　　　2,322,353
DIELECTRIC MATERIAL
Filed Nov. 4, 1939
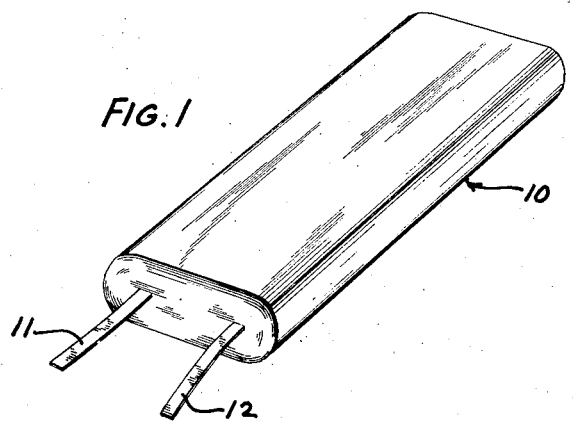
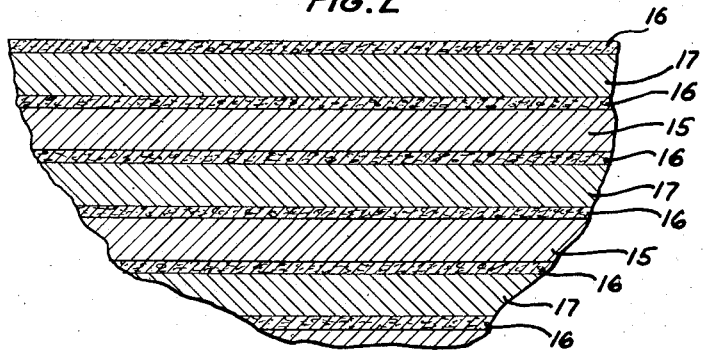
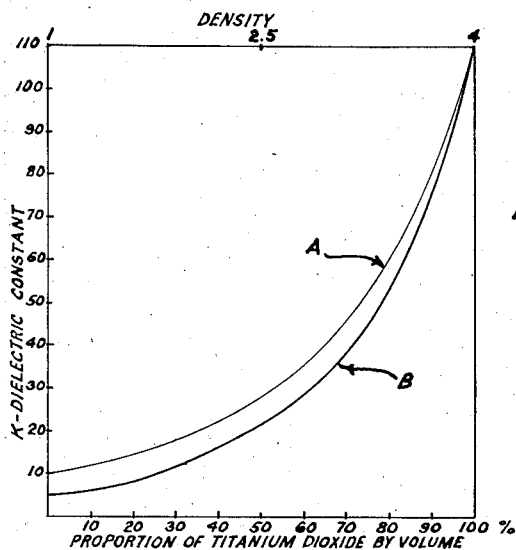
INVENTOR
H. F. FRUTH
BY Emery Robinson.
ATTORNEY Patented June 22, 1943

2,322,353

UNITED STATES PATENT OFFICE 2,322,353

DIELECTRIC MATERIAL

Hal F. Fruth, Riverside, Ill., assignor to Western Electric Company, Incorporated, New York, N. Y., a corporation of New York Application November 4, 1939, Serial No. 302,835

5 Claims. (Cl. 106—171)

This invention relates to dielectric material for use in electric condensers of the type having plates of conducting material separated by a solid dielectric medium, and to methods for making such condensers.

An object of this invention is the production of an electric condenser of economical construction having high capacity values in proportion to its volume and improved operating characteristics.

Condensers of the type comprising plates or electrodes of metal and an inert intermediate dielectric, such as sheets of impregnated paper or mica, have been used extensively in electrical apparatus. In these condensers, the effective capacity is inversely proportional to the distance between the electrodes and directly proportional to the dielectric constant of the insulating medium between the electrodes, other factors being equal. It is, therefore, desirable to use an insulating material with a high dielectric constant and to apply the material in a very thin layer in order to provide high unit capacity and thus minimize the required electrode area and cost of the condenser.

Certain crystalline materials exhibit very high dielectric constants in comparison with paper and mica. For example, titanium dioxide, or Rutile, crystals have a specific inductive capacity as high as 170 along their principal or major axis and around 90 along their transverse axis. A random mixture of titanium dioxide particles has a dielectric constant around 110. However, the utilization of these inherently advantageous properties in electric condensers has been subject to certain limitations. One primary objection has been the difficulty in applying the titanium dioxide to the condenser electrodes in a sufficiently thin layer. Ceramic or fused bodies of titanium dioxide have been prepared for this purpose, but their use is limited to constructions wherein the insulation can be applied in its ultimate shape and form. Also, the ceramic bodies are necessarily made relatively thick, in order to provide sufficient strength for handling in their unfired form, and the low area-volume ratio of these bodies reduces the condenser capacity proportionately.

In accordance with one embodiment of this invention, an efficient electrostatic condenser having a high capacity relative to its volume is provided by coating finely divided particles of titanium dioxide with an organic binder such as cellulose acetate, applying the coated particles in a thin layer on metal foil, hot calendering the coated foil to coalesce the binder and densify the foil coating, winding the coated foil into a condenser, and impregnating the condenser with an agent such as a chlorinated naphthalene, to regulate and improve its temperature-capacity coefficient.

Following is a more detailed description of the invention, taken in conjunction with the appended drawing, in which Fig. 1 is a perspective drawing of a condenser embodying certain features of the invention;

Fig. 2 is an enlarged fragmentary view of the condenser shown in Fig. 1; and

Fig. 3 is a chart showing certain properties of condenser insulation made in accordance with the invention.

The type of condenser to which the invention is primarily adapted comprises conducting plates or electrodes with suitable terminals attached thereto and insulation between the plates. The electrodes may be flat or they may be formed of flexible metal foil rolled or wound into a compact body. A wound or rolled type condenser 10 is shown in Fig. 1. This structure comprises two sheets of metal foil separated by insulation and wound into an oval body. Each sheet of foil has a terminal 11 and 12 electrically connected thereto. These general condenser constructions are well known and this invention relates to the composition, preparation, application and treatment of the insulation used between the electrode layers.

To prepare the insulation, titanium dioxide is first ground or pulverized into fine particles. The optimum particle size depends somewhat on the service requirements of the condenser, but, in general, particles that will pass through a 320 mesh screen are satisfactory.

The fine particles of titanium dioxide are next coated with an organic material that serves as a binder. Various organic materials are satisfactory for this purpose including certain cellulose derivatives, some types of shellac, tung oil and phenol resin. In general, the binder should have good dielectric properties, such as a high dielectric constant and a low power factor, be chemically stable, and be available in a form suitable for application on the titanium dioxide particles. Cellulose acetate possesses these properties, is particularly adapted for coating on the titanium dioxide particles, and is used preferably.

In the particle coating operation, the cellulose acetate is first reduced to a plastic consistency by heating or the addition of a solvent such as acetone. The plastic material is then mixed mechanically with the titanium dioxide particles in a suitable apparatus, such as a ball mill. Agitation of the mixture in the mill is continued until the particles are completely coated with the cellulose acetate.

The proportion of binder to be used depends upon the size of the particles, the construction and service requirements of the condenser and the type of binder employed. It is desirable to completely cover each particle without providing a great excess of binder. The effect of variations in binder content is illustrated on the chart shown in Fig. 3. The two curves A and B on this chart show the dielectric constant of mixtures prepared with various proportions of binder. As demonstrated by the curves, the dielectric constant increases rapidly with reduction of binder content and for that reason it is desirable to use only enough binder to adequately coat the particles. A mixture containing about 20% cellulose acetate by volume and the remainder titanium dioxide particles sufficiently small to pass through a 320 mesh screen has been used successfully and, in general, a mixture containing from 10% to 50% of binder by volume and the remainder titanium dioxide particles of proper size is satisfactory.

The resultant mixture or coated particles can be incorporated in the condenser by various methods that are adapted primarily to the structure of the electrodes. For use with flat plates or electrodes, the mixture can be molded into flat bodies under heat and pressure, the thermoplastic coating on the particles serving to bind them in a unitary body. For use with either flat or rolled type electrodes, the mixture can be applied on the surface of a paper or other sheet material and the coated sheet then inserted between the electrodes. However, it is difficult to produce the insulation in sufficiently thin bodies in either of these forms and the best results are obtained by applying the mixture directly on the electrodes.

The exact electrode coating method is adapted to the size and shape of the electrodes. For insulating flat electrodes, the mixture, in a paste-like consistency, can be painted or spread evenly on the electrodes with a suitable tool. Metal foil used for coiled or rolled condensers can be coated conveniently by conducting the foil through a bath of the mixture, thinned with solvents or heat. A sufficient quantity of cellulose acetate solvent, such as acetone, is added or sufficient heat is applied to make the cellulose acetate coating on the particles plastic and cause them to adhere to the foil. The speed of the foil through the mixture is regulated to insure formation of a continuous coating of the particles on both faces of the foil.

After the electrodes are coated, the mixture is solidified, by evaporation of the solvent or by cooling, and the coating is then treated to increase its density and improve its uniformity. This is accomplished by calendering the coated electrodes between heated rotating rolls positioned a fixed distance apart or by pressing the coated electrodes between the heated platens of a press. The combination of heat and pressure fully coalesces the particle coatings, compacts the foil coating to reduce the presence of voids therein, and also improves the uniformity of the coating thickness.

The coated electrodes are then assembled or wound into a condenser. To form the rolled condenser shown in Fig. 1, a strip of the coated metal foil is placed upon a strip of uncoated metal foil of the same thickness. The coated and uncoated foil strips thus assembled are wound into a body on a conventional condenser winding machine. These machines embody a rotating mandrel, which engages the end portions of the two foils and then winds them into the condenser structure. During the winding operation, a terminal 11 and 12 (Fig. 1) is connected electrically to each of the foil strips in any suitable manner.

In the wound structure, the coated and the uncoated foils are spaced apart and insulated throughout the structure by the coatings on the coated foil. As shown in Fig. 2, the alternate layers formed by the uncoated foil 15 engage the insulating coatings 16 on the two surfaces of the coated foil 17. By using a single, compact and thin insulating film of high specific dielectric value between the turns or layers of foil in this manner, a structure having a high capacity in proportion to the electrode area is produced.

Aluminum foil is used generally for condensers of this type. For some applications, it is beneficial to provide a coating of aluminum oxide on the bare or uncoated foil 15. This oxide coating is preferably applied by the anodic oxidation process, which is well known. When anodically oxidized aluminum foil is used, the oxide layer engages the titanium dioxide coating on the adjacent foil to provide a particularly effective insulation for high potential condenser service.

The condenser in this form, with or without the oxide coating on one foil, is satisfactory for certain fields of service. It has good properties at low operating temperatures, but its capacity rating is reduced as the temperature of the condenser is increased. In some cases, the capacity value was reduced as much as 20% when the temperature of the condenser was raised from 70° F. to 110° F.

To improve this characteristic, the wound structure is impregnated with an agent to adjust the temperature-capacity coefficient. Chlorinated naphthalene is the preferred agent and hydrogenated castor oil is also suitable for this purpose. Both of these materials are solids at room temperatures and they are applied to the condenser in hot or liquid form. In the impregnating process, it is preferable to first evacuate all air from the condenser and then completely immerse the condenser in the agent. This causes the agent to fill any voids in the foil coating, as well as any minute spaces between the coating and the foil. The impregnating agent and the titanium dioxide-binder coating cooperatively provide a temperature-capacity coefficient that is slightly positive with the result that the capacity of the condenser is actually increased at elevated temperatures. The effect of the impregnant on the dielectric constant of the titanium dioxide-binder mixture at a temperature of 70° F. is shown in Fig. 3, where line A represents values for a condenser impregnated with hydrogenated castor oil and the line B shows the values for a condenser impregnated with chlorinated naphthalene.

Flat type condensers can also be made by this general procedure. The flat electrodes can be coated by immersion in a fluid mass of the coated titanium dioxide particles and cellulose acetate, followed by drying and hot pressing to coalesce and densify the coating. The flat coated electrodes are then assembled with bar or oxide coated electrodes and the assembly is then impregnated with the temperature-capacity coefficient adjusting agent.

The above described procedures are satisfactory when a thermoplastic binder is used. If a thermosetting binder material, such as a phenolic base resin is employed, a final and more prolonged heating of the coated electrode is necessary to mature the binder.

For some condenser types, it is desirable to coat all the electrodes, or both foils of a wound condenser, with the titanium dioxide-binder insulation. However, the use of a single insulating layer between electrodes, as above described, is preferred because this construction provides the closest electrode spacing. This preferred construction, due to the dielectric constant values of the insulation, results in a high capacity per unit of electrode area and thus minimizes the cost of the condenser.

Other adaptations of the methods and articles described herein will be apparent and it is to be understood that the invention is limited only by the scope of the appended claims.

What is claimed is:

1. A dielectric material for use in electrical apparatus such as electric condensers comprising a mixture of titanium dioxide particles, cellulose acetate, and a wax-like material selected from the group consisting of hydrogenated castor oil and chlorinated naphthalene, said mixture having a dielectric constant greater than fifty in the solid state and a positive temperature coefficient of dielectric constant.

2. A dielectric material for use in electrical apparatus such as electric condensers comprising about 20% cellulose acetate by volume, finely divided particles of titanium dioxide dispersed in the cellulose acetate, and a wax-like material selected from the group consisting of hydrogenated castor oil and chlorinated naphthalene in the voids in the cellulose acetate and the voids between the cellulose acetate and the particles, said dielectric material having a dielectric constant in the solid state greater than fifty and a positive temperature coefficient of dielectric constant.

3. A dielectric material for use in electrical apparatus such as electric condensers comprising from 50% to 90% of finely divided titanium dioxide particles sufficiently small to pass through a screen on the order of 300 mesh, a cellulose acetate binder for said particles, and a sufficient quantity of wax-like material selected from the group consisting of hydrogenated castor oil and chlorinated naphthalene to fill the voids in said binder and the voids between the binder and particles, said dielectric material having a dielectric constant greater than fifty in the solid state and being capable of providing a positive temperature-capacity coefficient when incorporated in an electric condenser.

4. A dielectric material for use in electrical apparatus such as electric condensers comprising a mixture of titanium dioxide particles, cellulose acetate and hydrogenated castor oil, said mixture having a dielectric constant greater than fifty in the solid state and a positive temperature coefficient of dielectric constant.

5. A dielectric material for use in electrical apparatus such as electric condensers comprising a mixture of titanium dioxide particles, cellulose acetate and chlorinated naphthalene, said mixture having a dielectric constant greater than fifty in the solid state and a positive temperature coefficient of dielectric constant.

HAL F. FRUTH.